United States Patent [19]
Sexton

[11] Patent Number: 4,813,981
[45] Date of Patent: Mar. 21, 1989

[54] DUAL MODE AIR PURIFIER AND METHOD

[76] Inventor: John M. Sexton, P.O. Box 343, Pleasant Garden, N.C. 27313

[21] Appl. No.: 233,762

[22] Filed: Aug. 19, 1988

Related U.S. Application Data

[63] Continuation of Ser. No. 98,978, Sep. 21, 1987, Pat. No. 4,790,860.

[51] Int. Cl.$^4$ .............................................. B01D 53/04
[52] U.S. Cl. .......................................... 55/59; 55/74; 55/75; 55/161; 55/208; 55/267; 55/274; 55/356; 55/DIG. 35
[58] Field of Search ................... 55/31, 33, 59, 62, 74, 55/75, 161, 163, 179, 208, 267, 274, 275, 316, 356, 387, 389, 474, DIG. 33, DIG. 35

[56] References Cited

U.S. PATENT DOCUMENTS

| | | | |
|---|---|---|---|
| 1,789,262 | 1/1931 | Monro et al. | 55/387 X |
| 1,948,779 | 2/1934 | Abbott et al. | 55/31 |
| 1,959,389 | 5/1934 | Shoosmith | 55/62 X |
| 2,083,732 | 6/1937 | Moore et al. | 55/33 X |
| 2,629,460 | 2/1953 | Maki | 55/33 |
| 2,712,981 | 7/1955 | Beggs | 55/33 |
| 2,910,139 | 10/1959 | Matyear, Jr. | 55/31 X |
| 3,261,145 | 7/1966 | Paulson et al. | 55/208 X |
| 3,384,976 | 5/1968 | Westeren | 55/208 X |
| 3,531,916 | 10/1970 | Kulperger et al. | 55/33 |
| 3,572,008 | 3/1971 | Hankison et al. | 55/33 |
| 3,734,293 | 5/1973 | Biskis | 55/208 X |
| 3,804,942 | 4/1974 | Kato et al. | 55/316 X |
| 4,231,768 | 11/1980 | Seibert et al. | 55/179 |
| 4,439,213 | 3/1984 | Frey et al. | 55/33 X |
| 4,572,178 | 2/1986 | Takase et al. | 55/316 X |
| 4,698,075 | 10/1987 | Dechene | 55/163 |

FOREIGN PATENT DOCUMENTS

| | | | |
|---|---|---|---|
| 3423561 | 1/1986 | Fed. Rep. of Germany | 55/208 |
| 45761 | 11/1977 | Japan | 55/163 |
| 1300744 | 12/1972 | United Kingdom | 55/33 |

OTHER PUBLICATIONS

Linde Molecular Sieves Adsorbent Data, undated publication.
The Carulite Series–Copyright 1984.
Air Purification with Granular Activated Carbon, Calgon Corporation, Copyright 1975.
Breathing Air Process Systems and Accessories, Eagle Air Systems, undated publication.
Deltech Heatless Compressed Air Dryers G Series–undated publication.
Zurn Air Drying Systems Brochures, 1985.
Pharm-Air Purification System, Pall Corporation, Jul. 1978.
Sahara Model HL Heatless Regenerative Air Dryer, undated publication.
Other Sahara Products, copyright 1984.

Primary Examiner—Robert Spitzer

[57] ABSTRACT

A dual mode compressed air purifier is presented having a cart for transportation purposes and including a chemical medium purifier with a regenerable filter cartridge. A first purification mode removes water, carbon dioxide, hydrocarbons and other impurities from compressed air which is then available for supplied air respirators of workers in hazardous environments. In the second or regeneration mode compressed air is heated and then delivered to the chemical medium purifier whereby impurities removed by the medium during purification are collected and expelled by the hot air and are then exhausted from the dual mode air purifier. The cooling cycle of the regeneration mode returns the chemical medium purifier to an ambient temperature after which purifying can begin again.

12 Claims, 7 Drawing Sheets

DUAL MODE AIR PURIFIER AND METHOD

This is a continuation of application Ser. No. 098,978, filed Sept. 21, 1987, now U.S. Pat. No. 4,790,860.

BACKGROUND OF THE INVENTION

1. Field of the Invention

The present invention relates to a transportable air purifier for removing pollutants from compressed air for supplied air respirators and otherwise for use in industrial applications.

2. Description of the Prior Art and Objectives of the Invention

Employee safety has become increasingly important in manufacturing and processing operations in recent years with the enactment of new state and federal laws. Particular attention has been directed to the air breathed by employees during maintenance, handling and removal of hazardous materials such as various solvents or asbestos which has minute particles that are harmful when airborne. In order to protect employees from such hazardous particulate and gaseous matter, supplied air respirators are furnished to workers which are conventionally connected to a stationary central source for purified air. Such conventional purifier sources may have a disposable cartridge which must be periodically changed and replaced. Other purifiers of the permanent type usually provide for a regeneration cycle and usually have two filter cylinders or chambers whereby when one cylinder is being regenerated the other cylinder is simultaneously used to purify the required air. As different employees often on different shifts continually use such purifying systems, the purifiers frequently are not properly attended and the filters therein become saturated with pollutants and lose their filtration and absorption qualities, thus allowing harmful pollutants to pass through to the respirators worn by the workers. While some of the prior art purifying devices include monitors with signals to identify expended filters, such purifying devices are oftentimes inconvenient to maintain and expensive to service and are therefore neglected, creating a health hazard for the workers.

With the aforesaid problems and disadvantages associated with conventional air purifying devices, the present invention was conceived and one of its objectives is to provide a dual mode air purifier and method for purifying compressed air having purification and regeneration modes which is convenient and simple to operate.

It is also an objective of the invention to provide a compressed air purifier in which the regeneration mode has both heating and cooling cycles.

Yet another objective is to provide a purifying device which has a cart which allows the purifier to be easily and conveniently moved by a single worker during use as needed and after use to another location if desired for regeneration purposes.

It is still another objective of the present invention to provide a dual mode air purifier which includes an air filter having a heater attached thereto for providing hot purge air directly to the air filter medium during the regeneration cycle to quickly and efficiently regenerate the filter medium.

Another objective of the present invention is to provide an economical air purifier and method which has the capacity for continued use during a typical work shift and which can thereafter be moved by a single employee to another location for regeneration during off-hours.

Also, another objective of the present invention is to provide a dual mode air purifier and method which can be correctly operated by relatively unskilled employees after only minimal training.

Other objectives and advantages of the present invention will become apparent to those skilled in the art as a more detailed description of the invention is presented below.

SUMMARY OF THE INVENTION

The aforesaid and other objectives are realized by a dual mode air purifier having a chemical medium purifier consisting of filter housing containing a regeneratable filter medium cartridge. The first or purification mode is determined by a selector switch and can be changed to the regeneration mode having "heating" and "cooling" cycles simply by turning a selector switch. Attached to the filter housing is an air heater featuring a heating element which allows hot air produced by the heating element to be passed directly to the filter medium within the filter cartridge. The chemical medium purifier and air heating device are supported within a movable cart for transportation as required during use or thereafter for movement to another location for regeneration. The method of operating the dual mode purifier is simply to make the proper line connections to an air compressor and to the supplied air respirators and with the selector switch set to "purify", the purifier is operational. Compressed air will enter the air filter medium for contaminant removal and thereafter passes out of the filter to the air respirators worn by workmen.

Purging or regenerating the chemical medium purifier is accomplished by connecting the air heater to a suitable electrical source such as 220 v AC and setting the selector switch to "heat". Compressed air is directed into the heater where its temperature is raised and the hot air is then passed to the chemical medium purifier where the heated air desorbs contaminants contained in the filter medium which is thereafter exhausted. Next, by manually turning the selector switch after a prescribed time to "cool", the cooling cycle allows ambient compressed air to be directed through the deenergized heater and around the outside of the filter cartridge after which the air is then exhausted and purifying can begin again.

DESCRIPTION OF THE PREFERRED EMBODIMENT

Figure 3:
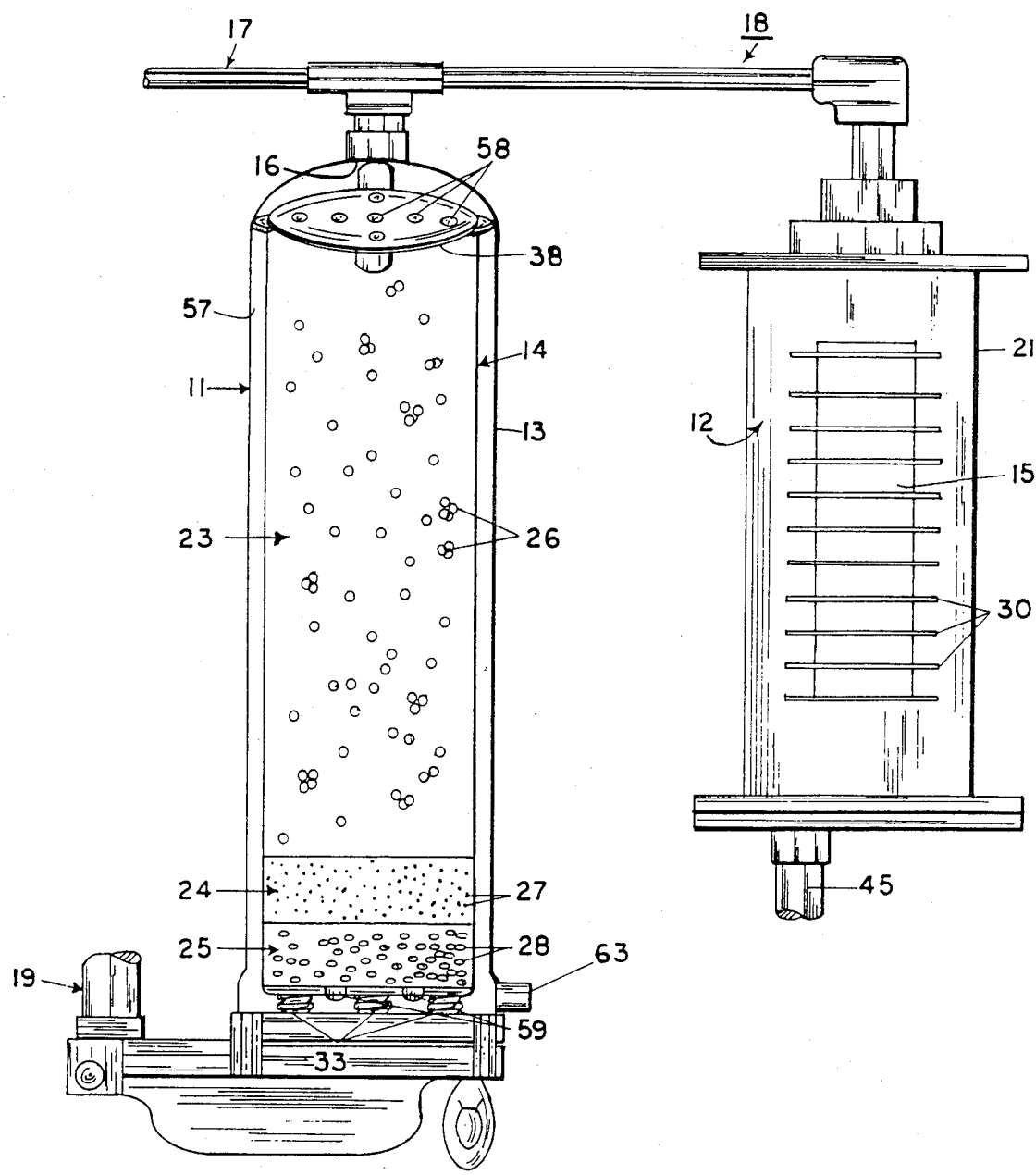
FIG. 3 illustrates an enlarged cross-sectional view of the inverted substantialy J-shaped filter assembly including chemical medium purifier and heating components removed from the cabinet.
Figures 4, 4A:
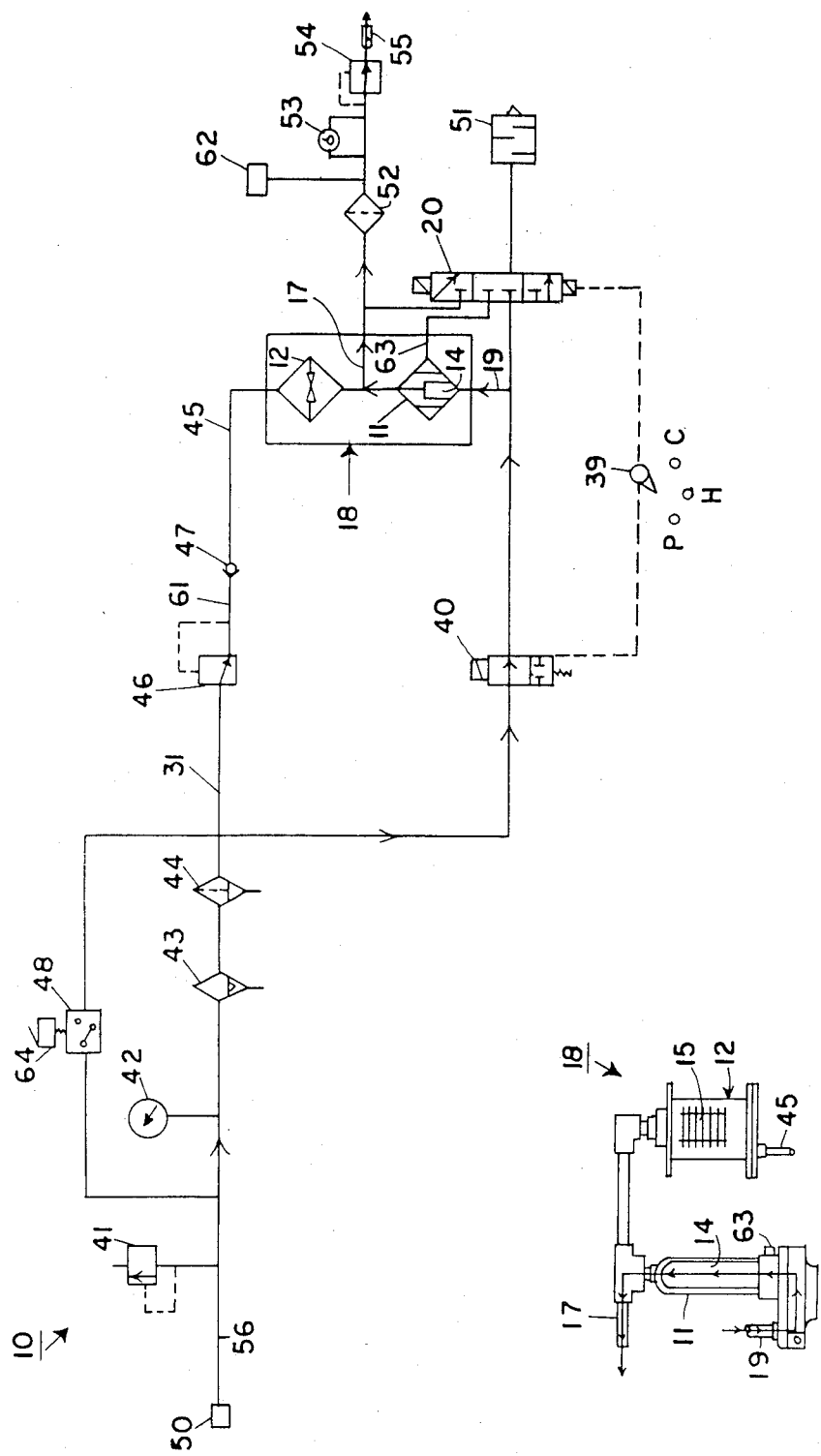
FIG. 4 demonstrates in schematic fashion the flow of compressed air in the purification mode.
FIG. 4A shows an enlarged schematic flow through the filter assembly of FIG. 4 in the purification mode.

A schematic view of the preferred form of the components of the dual mode air purifier is shown in FIG. 4 having a chemical medium purifier with a regeneratable filter cartridge contained within a filter housing as seen in FIG. 3. The cartridge includes three (3) compartments, each compartment containing a different chemical medium for compressed air purification. Attached to the chemical medium purifier is an air heater of the electrical resistance type for supplying hot air during regeneration of the filter medium.

The preferred method of the invention comprises purifying compressed air by directing air from the compressor to the compressed air inlet of the dual mode air purifier and supplied air respirators are connected to the purified air outlet. Two internal solenoid air valves are electrically operated and in the purifying mode are deenergized. Regeneration of the spent chemical medium consists of connecting the unit to a suitable electrical source which will energize a directional control valve terminating the purification mode. A selector switch set to "H" (heat) on the control panel will change the inlet directional control valve to direct compressed air at a lower pressure into an air heater where it is heated to approximately 450° F. and thereafter passed into the chemical medium purifier where contaminants are removed from the filter medium and the air is then exhausted. Lastly, unheated air is directed around the outside of the chemical filter cartridge for cooling purposes by manually changing the selector switch to "C" (cool) which changes the inlet directional control valve thereby allowing ambient air to circulate around the outside of the filter medium after which it too is then exhausted.

DETAILED DESCRIPTION OF THE DRAWINGS AND OPERATION OF THE INVENTION

Figure 1:
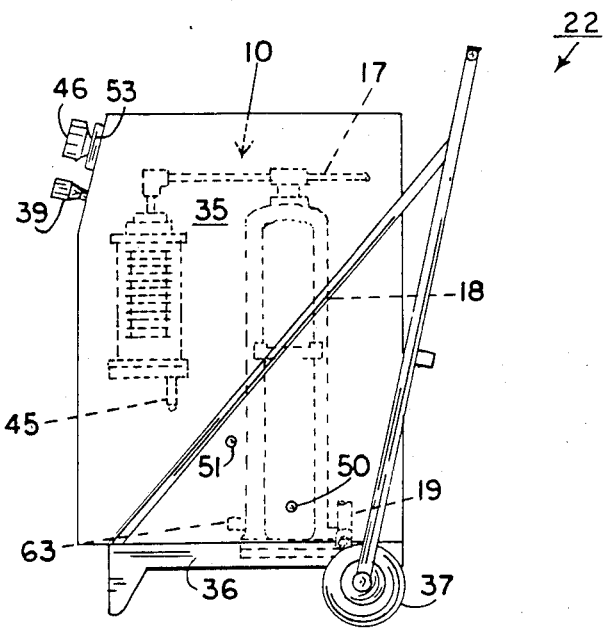
FIG. 1 demonstrates a side elevational view of a cart cabinet housing the dual mode air purifier.
Figure 5:
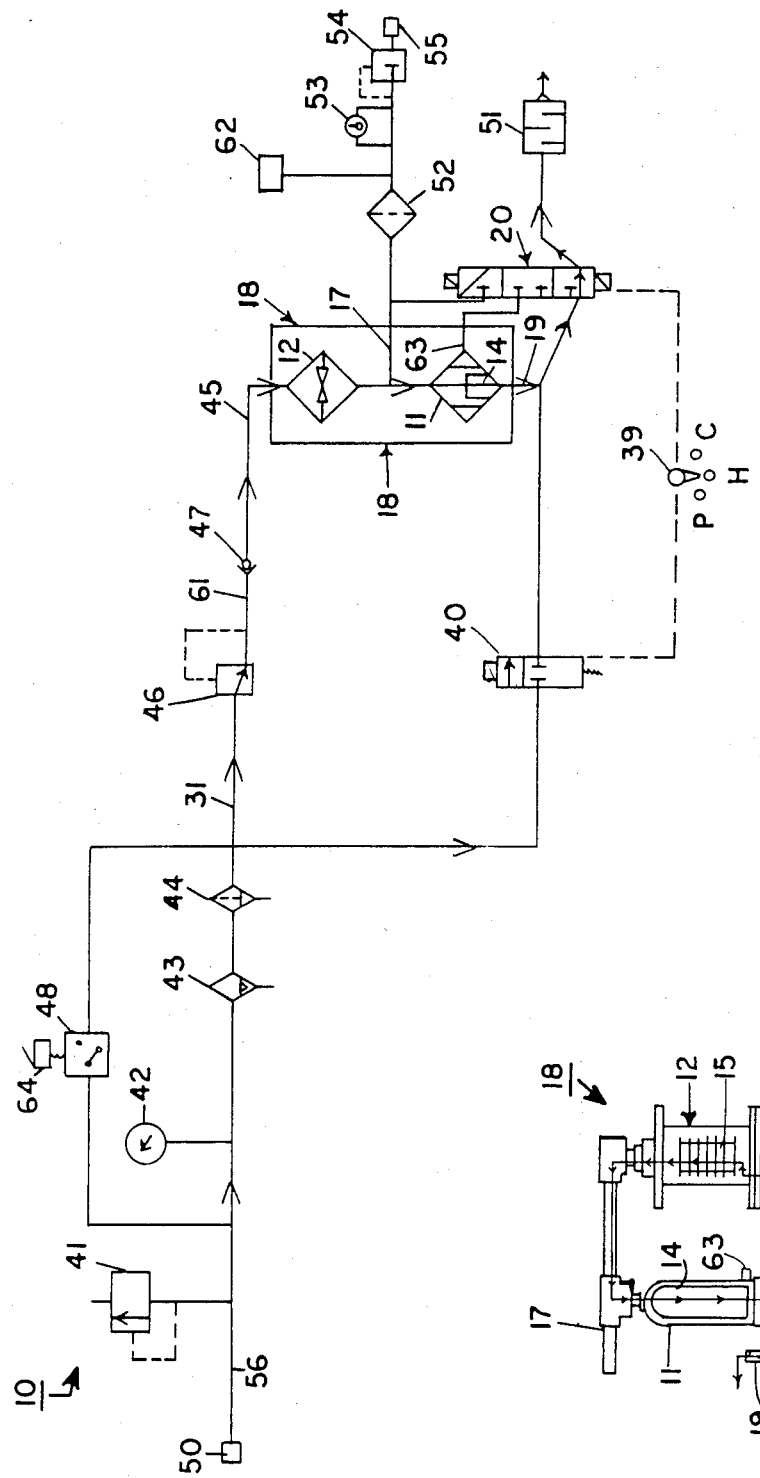
FIG. 5 demonstrates in schematic fashion the flow of compressed air in the heating cycle of the regeneration mode.
Figures 6, 6A:
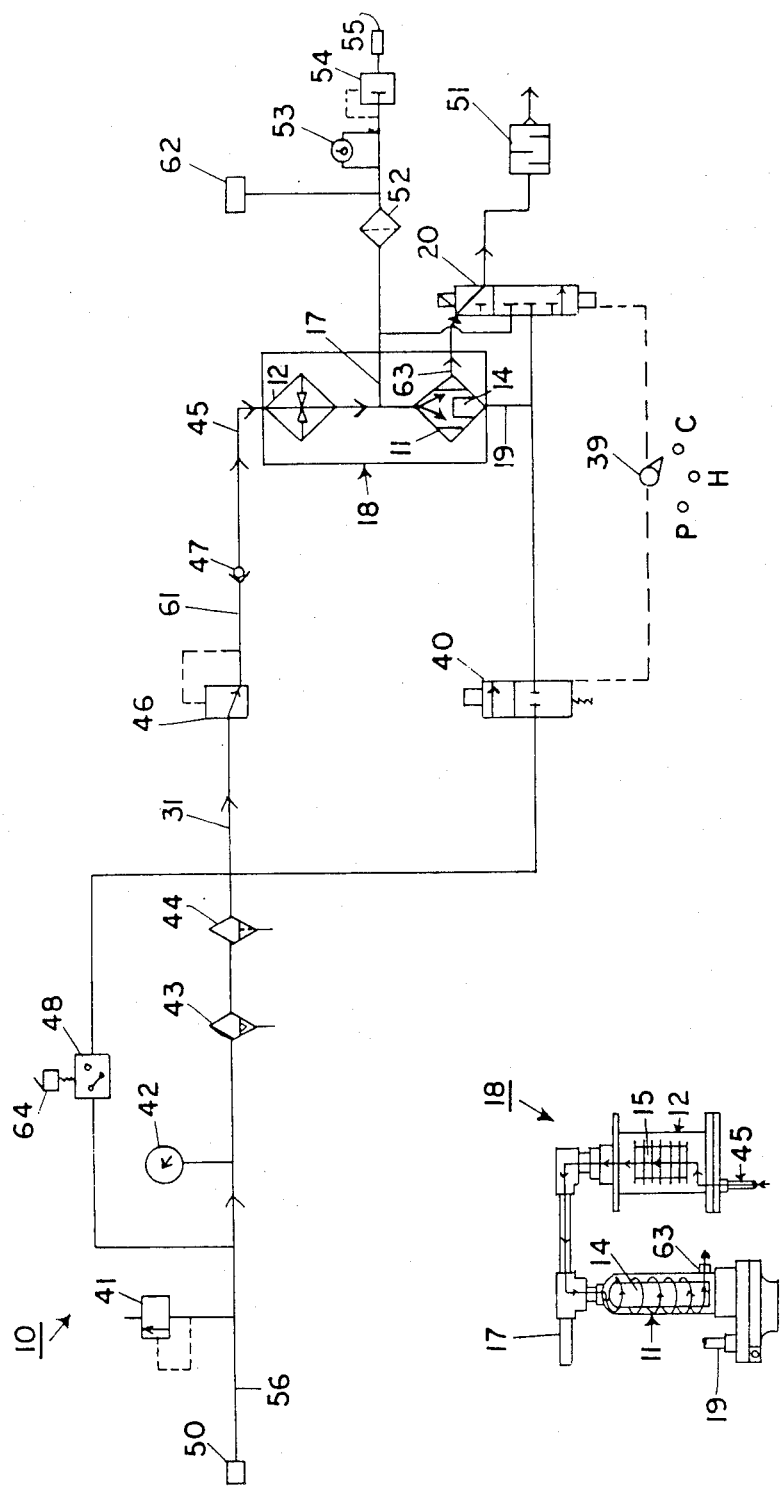
FIG. 6 demonstrates in schematic fashion the flow of compressed air in the cooling cycle of the regeneration mode.
FIG. 6A shows an enlarged schematic flow through the filter assembly of FIG. 6 in the cooling cycle.

Dual mode air purifier 10 is shown in schematic view in FIGS. 4, 5 and 6 in which the components are contained within cart housing 35 of movable cart 22 as seen in FIG. 1. Cart housing 35 is permanently attached to cart frame 36 whereby dual mode air purifier 10 can be rolled on wheels 37 and positioned at a specific location within a factory or otherwise as required for supplying purified compressed air and can be easily rolled or moved to a second location for regeneration purposes. In addition to inverted substantially J-shaped filter assembly means 18 comprising chemical medium purifier 11 and air heating means 12 as shown in FIG. 3, cart housing 35 contains other components as seen in the schematic views. In the purification mode or "P" setting on switch 39, raw compressed air from a conventional industrial air compressor 65 (FIG. 7) is the supply source. Compressed air inlet 50 (FIG. 4) is joined to a conventional air compressor supply line 66 (FIG. 7) which passes air through supply conduit 56 (FIG. 4).

Figure 2:
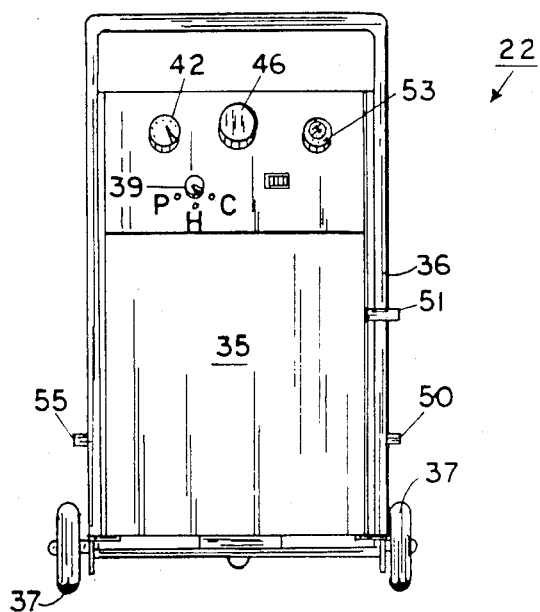
FIG. 2 is a front elevational view of the cart cabinet as shown in FIG. 1.
Figure 7:
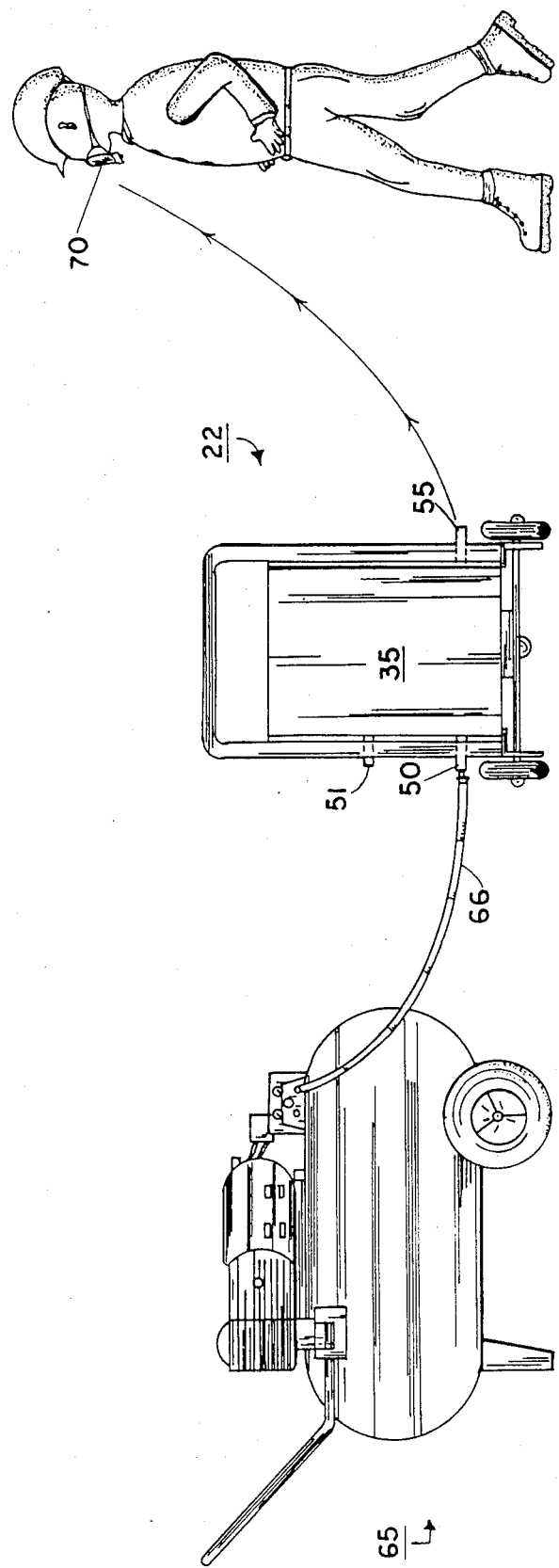
FIG. 7 depicts a typical simplified set-up in schematic form utilizing the dual mode purifier.

Pressure relief valve 41 senses the incoming air pressure and acts as a safety valve by venting air having a pressure over a preset maximum. Inlet pressure gauge 42 provides the operator with the proper pressure reading and is positioned as shown in FIG. 2 on the front of cart housing 35. Mechanical separator 43 with automatic drain and oil removal filter 44 also having an automatic drain is provided as is differential pressure switch 48 which prevents the pressure therebetween from increasing above a maximum established level without issuing a warning signal. Air passing along supply conduit 56 next encounters (1) two-way on/off solenoid control valve 40 which is deenergized and in the "on" state is in the purification mode, and (2) pressure relief valve 46 set to 5 psi. Air will flow through solenoid control valve 40 and not through pressure relief valve 46 in the purification mode because pressure is greater in line 45 than in line 61. As seen in FIG. 4 control valve 40 is in the open position (deenergized) thereby allowing compressed air flowing therethrough to enter filter housing air inlet line 19 and to pass into the chemical medium purifier 11 as better seen in FIG. 4A. The pressure in line 45 is greater than in line 61 thus preventing air flow from line 61 through check valve 47 to line 45. This pressure differential prevents bypass of the compressed air around chemical medium cartridge 14. Control valve 20 is a solenoid operated three-way control valve with a center position, all ports blocked mode, and is not energized in the purification mode. Thus, compressed air will not pass through control valve 20 in its deenergized state. Chemical medium purifier 11 which includes medium catridge 14 has three (3) compartments of chemical filter medium therein. As seen in FIG. 3 top medium compartment 23 contains activated carbon 26, middle medium compartment 24 contains a manganese dioxide catalyst 27 and bottom medium compartment 25 contains an alkali-metal alumino silicate 28 commonly referred to as a molecular sieve. Medium cartridge 14 is contained within filter housing 13 of chemical medium purifier 11 and is affixed therein. Coil springs 33 insures the chemicals within medium cartridge 14 are tightly compacted preventing them from becoming airborne. Top cap 38 of medium cartridge 14 includes a series of apertures 58 whereby air entering air inlet line 19 in the purification mode passes into medium cartridge 14 through bottom apertures 59 for exiting through apertures 58 where the purified air then moves through filter housing air outlet line 17. The purified air then passes through particle filter 52 (FIG. 4), moisture indicator 53, minimum pressure valve 54 which is set to maintain 50 psi, and through distribution outlet 55 where it is then delivered to one or more breathing apparatus such as supplied air respirators 70 worn by workmen as seen in FIG. 7. Minimum pressure valve 54 serves two purposes. First it insures that air passing through air filter means 18 maintains a minimum pressure to insure a minimum desired water vapor condensation rate and secondly, it maintains a minimum pressure on line 45 as explained earlier above.

Figure 5A:
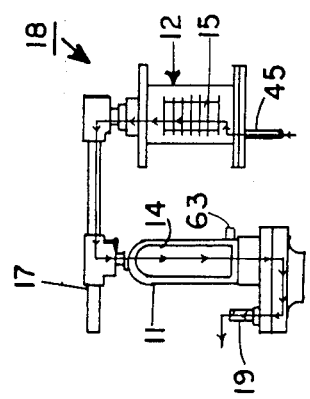
FIG. 5A shows an enlarged schematic flow through the filter assembly in FIG. 5 in the heating cycle.

During the heating cycle of the regeneration mode with a 110 v AC supply connected, compressed air enters air inlet 50 as above described and proceeds first to directional solenoid control valve 40 which is closed as seen in FIG. 5 and said compressed air is then directed into heating means air inlet line 31. Control valve 40 is energized in this cycle as is control valve 20 and manual selector switch 39 on the front panel of movable cart 22 is set to "H" (heat") which is in electrical communication with valves 20 and 40. Thus when first control valve 40 is closed and second control valve 20 is operating in the heating cycle, the air flow is as depicted in FIGS. 5 and 5A. After passing through heating means air inlet line 31 the compressed air then passes into the adjustable pressure regulator 46 which is preset to reduce pressure to 5 psi or to a pressure to maintain a 5 scfm flow rate. Air is directed through line 61 to check valve 47 which allows air to pass only forwardly as described. The compressed air then enters air heating means 12 (via line 45) enclosed in air heating means housing 21 (FIG. 3) where it encounters heating element 15 which comprises an electrical resistance strip heater with heating element fins 30. The temperature of the air is increased in heating element 15 to approximately 450° to 500° F. where it is forced upwardly a short distance through filter housing top opening 16 and into medium cartridge 14 (FIG. 3). The hot air flows into chemical medium 26, 27 and 28 (FIG. 3) where it will dry (collect) any moisture contained therein. The flow into cartridge 14 will also expel pollutants and contaminants to refresh said chemical medium contained therein. Thereafter the air containing pollutants exits conduit 19 through second control valve 20 and exhaust muffler 51 (FIG. 5). Once the regeneration heating cycle has proceeded for a calculated time to remove the pollutants and moisture from medium cartridge 14 contained within chemical medium purifier 11, such as with a purge rate of approximately 5 scfm, heating is then stopped and the cooling cycle can begin.

Selector switch 39 is now manually set to "C" (cool). In this cycle, heating element 15 is not energized and air flows around the outside of medium cartridge 14 allowing it and its contents to approach ambient temperature (see FIG. 6A). Medium cartridge 14 is cooled by having the unheated ambient air flow along a path on the outside of cartridge 14 and then through second control valve 20 to exhaust muffler 51. FIGS. 6 and 6A illustrate this flow path.

Figure 8:
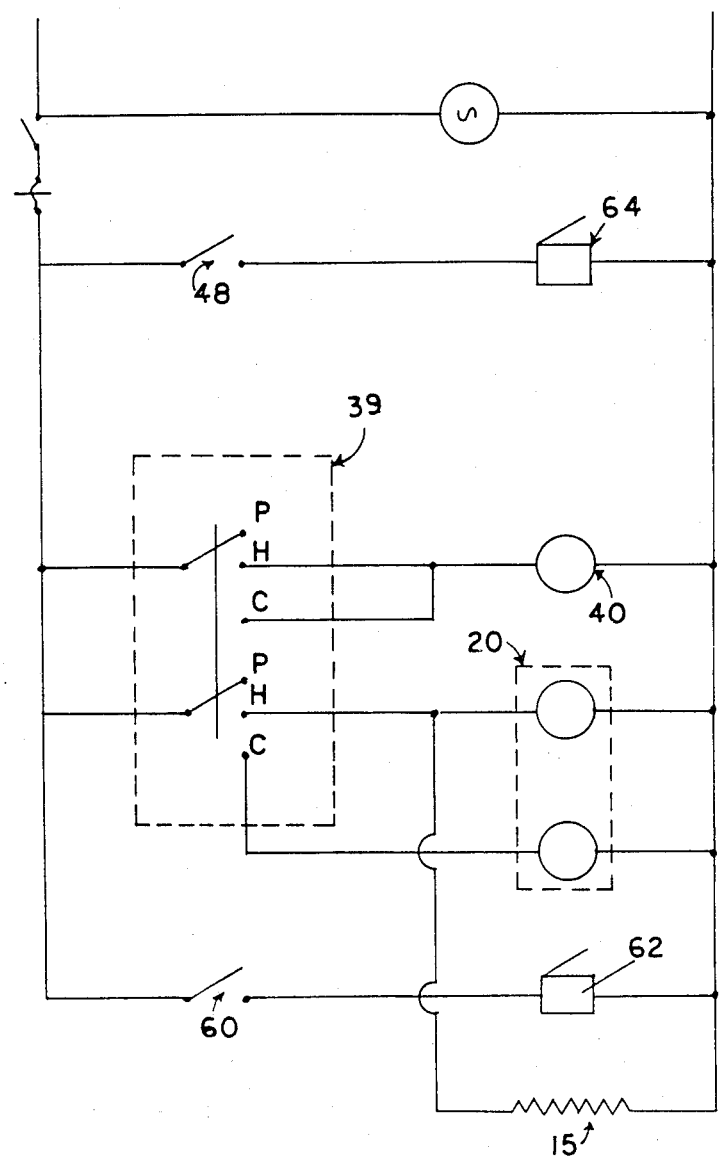
FIG. 8 illustrates an electrical schematic of certain of the components.

As would be understood, the present invention makes it extremely convenient to purify compressed air at various sites within a plant where compressed air is available and at night or during off shifts, the dual mode purifier can be rolled to another location and regenerated for use the next day. As an added precaution, alarm device 62 with switch 60 (FIG. 8) as shown in FIGS. 4, 5, and 6 indicates through alarm device 62 the presence of carbon monoxide; moisture indicator 53 will detect the presence of excess water; and differential pressure switch 48 will sound alarm 64 or light a lamp indicating that mechanical separator 43 with automatic drain and/or the oil removal filter 44 with automatic drain is clogged.

The illustrations and examples provided herein are for explanatory purposes and are not intended to limit the scope of the appended claims.

I claim:

1. A method of operating an air purifier having a chemical medium cartridge within a filter housing with the medium cartridge spaced inwardly from the walls of the filter housing to form a passageway between the medium cartridge and the housing comprising the steps of:
    (a) purifying air by directing air into the filter housing and through the chemical medium cartridge for contaminant removal,
    (b) regenerating the chemical medium within the cartridge by:
        (1) directing heated air into the chemical medium to remove contaminants therefrom,
        (2) exhausting the heated air from the chemical medium; and
        (3) cooling the chemical medium by directing ambient air through the passageway around the outside of the medium cartridge.
2. The method of claim 1 wherein the step of regenerating the chemicals medium comprises directing heated air from an electrical heating means to the chemical medium.
3. The method of claim 1 wherein the step of cooling the chemical medium includes exhausting the air from the passageway around the outside of the medium cartridge.
4. The method of claim 1 and including the step of utilizing a selector switch to change the air purifier from purification to regeneration mode.
5. The method of claim 4 wherein the step of utilizing a selector switch comprises changing the selector switch manually.
6. The method of claim 1 wherein the step of purifying air by directing air into the filter housing comprises directing air in a first direction into the chemical medium and thereafter directing heated air into the chemical medium in a second direction.
7. The method of claim 1 wherein the step of purifying air comprises directing air into the filter housing in a first direction, the step of regenerating the chemical medium comprises directing air into said housing in a second direction, and the step of cooling the chemical medium comprises directing air into the filter housing and around the chemical medium in the second direction.
8. An air purifier having a purification and a regeneration mode comprising: a chemical medium purifier, said medium purifier having:
    (a) a filter housing, and
    (b) a medium cartridge, said medium cartridge contained within and spaced inwardly from said filter housing to form a passageway between said filter housing and said medium cartridge, said medium cartridge for removing pollutants passing therethrough in the purification mode, air heating means, said heating means having:
    (c) heating means housing, and
    (d) a heating element, said heating means housing containing said heating element, said filter housing communicating with said heating means housing whereby, in the regeneration mode hot air can pass from said heating means into said filter medium cartridge and thereafter ambient air can pass from said heating means housing to said filter housing and around the outside of said medium cartridge in said passageway.
9. An air purifier as claimed in claim 8 and including a selector switch, said selector switch connected to said filter housing for controlling the operational mode.
10. An air purifier as claimed in claim 9 wherein said selector switch, when turned to a first setting causes air to travel in a first direction through said medium purifier and when turned to a second setting causes air to travel through said medium purifier in a second direction.
11. An air purifier as claimed in claim 8 wherein said filter housing and said heating means housing are contained within a movable cart.
12. An air purifier as claimed in claim 8 wherein said medium cartridge comprises a plurality of medium compartments.

* * * * *